United States Patent [19]

Lindstrom

[11] 3,802,878

[45] Apr. 9, 1974

[54] METHOD OF MAKING A POROUS ELECTRODE FOR ELECTROCHEMICAL CELLS

[75] Inventor: Olle B. Lindstrom, Taby, Sweden

[73] Assignee: Svenska Utvecklingsaktiebolaget, Stockholm, Sweden

[22] Filed: Dec. 20, 1971

[21] Appl. No.: 210,235

[30] Foreign Application Priority Data
Dec. 21, 1970 Sweden............................ 17275/70

[52] U.S. Cl..................... 75/208 R, 75/200, 75/222
[51] Int. Cl............................................... B22f 1/00
[58] Field of Search................ 75/222, 200, 208 R; 29/182

[56] References Cited
UNITED STATES PATENTS

| | | | |
|---|---|---|---|
| 3,413,116 | 11/1968 | Rao...................................... | 75/222 |
| 3,390,106 | 6/1968 | Geen et al. ........................... | 75/222 |
| 3,050,386 | 8/1962 | von Döhren et al.................. | 75/222 |

FOREIGN PATENTS OR APPLICATIONS 1,280,822   10/1968   Germany

OTHER PUBLICATIONS

Goetzel, Treatise on Powder Metallurgy, Vol. No. 1, 1946, Interscience Publishing.

*Primary Examiner*—Benjamin R. Padgett
*Assistant Examiner*—B. Hunt
*Attorney, Agent, or Firm*—Burns, Doane, Swecker & Mathis

[57] ABSTRACT

This invention relates to a porous electrode for electrochemical cells. These porous electrodes are produced by a method which comprises the steps of coalescing particles of an electrode material in the presence of particles of a pore-forming material, removing the pore-forming material from the electrode structure after the particles of the electrode material have formed a cohesive porous body, the particles of the pore-forming material being treated to form a mechanically cohesive porous body in which the electrode material is embedded during the step of coalescence.

6 Claims, No Drawings

METHOD OF MAKING A POROUS ELECTRODE FOR ELECTROCHEMICAL CELLS

This invention relates to a porous electrode for electrochemical cells.

The conversion of chemical energy to electrical energy as takes place in electrochemical cells takes place with a high efficiency. The conversion is silent and without vibration, while in addition many electrochemical cells operate without discharging noxious gases. The propulsion of electric motor vehicles by means of power from electrochemical cells is therefore a distinct possibility for solving a difficult environmental problem. A considerable amount of work is therefore being done on developing better electrochemical cells for electrically propelled vehicles. This applies both to improving the current source energy content calculated per unit of weight or volume, and the specific effect of the current source.

A considerable amount of work has been done on new types of electrochemical cell having active material with a higher energy content, one example being the sodium/sulphur battery, and on various kinds of fuel cell. An attempt is also being made to improve known electrochemical cells, such as lead-acid accumulators or the various alkali accumulators. Many of the electrochemical cells forming the subject of this development work have porous electrodes.

Electrochemical reactions usually take place at an interface, for example between solid electrode material and electrolyte. Porous electrode structures provide means of obtaining a larger interface between the material and electrolyte. Other types of electrodes, for example gas diffusion electrodes for simultaneous contact between gas, electrode and electrolyte, are also dependent upon a porous electrode structure to achieve a large reaction surface.

It is therefore a general development objective in this technological field to obtain increased porosity of the solid electrode material. This object is irrespective of whether the electrodes are used as gas diffusion electrodes, for example air cathodes in a metal/air battery, or as electrodes completely surrounded by the electrolyte, for example the metal anodes in a metal/air battery. A metal/air battery is a hybrid development of a fuel cell and a conventional accumulator. The metal/air battery uses an invariable air cathode which reduces atmospheric oxygen, and a conventional metal electrode, for example an iron anode, which is oxidised upon discharge in the same way as the negative electrode in an alkali accumulator.

Unfortunately, it is difficult to make porous electrodes with sufficient porosity and a suitable pore structure without neglecting other essential properties, such as mechanical strength and electrical conductivity. Good mechanical properties are required especially in power sources used for vehicle propulsion. The porosity of electrode materials used in practice is frequently less than or about 50 percent, the maximum porosity selected being limited by mechanical and electrical considerations. When the porosity is approximately 50 percent, the mechanical and electrical properties of the electrode must often be improved by means of inserting grids, perforate sheet, etc, in the electrode.

Powder metallurgy methods are very frequently used in the production of mechanically coherent porous electrode materials, the pores frequently being achieved by means of special pore-forming materials.

One powder metallurgy production method frequently used for porous electrode material comprises four stages: (1) preparation of the starting materials used (electrode material, pore-forming material and other additives) frequently by grinding and screening; (2) mixing the powdered raw materials into a homogeneous powder batch; (3) introduction of the powder mixture into a press tool and pressing; and (4) sintering the compacted material under conditions giving the required strength and electrical conductivity while retaining the maximum internal surface and porosity. Of course there are many variants of this example of production. More particularly, the pressing operation in the alternative methods is replaced by extrusion, injection, rolling, etc.

The pore-forming substances are generally added to the actual powder mix. The pore-forming substances generally occur in powder form, but liquids are also used. The pore-forming substances act in two different ways in principle. The most usual is that the pore-forming substance is separated at the start of the sintering operation and escapes in gaseous form. Examples of such pore-forming substances are urea, ammonium bicarbonate, plastic powder, and many other organic compounds which are evaporated, liberated or oxidised at the start of the sintering operation and escape substantially completely in gas form. Pores and cavities occur in the electrode material in such conditions at the place where the pore-forming substance was initially situated and has broken its way out through the compacted electrode material as a result of the gas which formed.

In the other type of pore-forming mechanism, the pore-forming substance is not changed during the sintering operation but remains as a volume ballast in the compacted material. After sintering, the pore-former is removed by washing out in a suitable solvent. Cavities thus form in the electrode structure where the pore-former was situated. Examples of such pore-formers are, in particular, inorganic salts, such as sulphates and chlorides, which can be dissolved out with water after sintering is complete.

In addition to these simple pore-forming processes, there are also special processes, for example pore-forming by means of aluminium, a process which is utilised specially for the production of active nickel electrodes for fuel cells. In such cases, there is a certain alloying of aluminium in the nickel phase during the sintering operation. The aluminium phase and the aluminium in the nickel-aluminium alloy formed is washed out with alkali solutions, resulting in the formation of pores in the same way as in the case of pore-formers which are not separated on sintering. There is also an activation of the inner nickel surfaces which gives a Raney nickel structure. In this process, there is the maximum approach to the aluminium melting point possible, bearing in mind that this melting point is lower than the required sintering temperature for nickel powder. The most important effect is the activation of the inner nickel surfaces. The amount of aluminium is preferably between 5 and 10 percent of the nickel phase weight. Pore-formers of conventional type are often used simultaneously with aluminium to increase the porosity. In practice, gas-forming pore-formers such as ammonium bicarbonate, or pore-formers of the ballaat type, such as potassium chloride, have been used for this purpose. The amount of these pore-formers is usually between 5 and 10 percent by weight.

The common feature of the known methods of using pore-formers in the production of porous electrode materials is that the only function of the pore-former is to produce cavities in the electrode material, apart from the special conditions when aluminium is used for simultaneous activation and pore-forming in nickel electrodes. When the amount of pore-former is increased to give increased porosity, the electrode strength rapidly deteriorates. The present invention seeks to eliminate the above limitations in a surprisingly simple manner by the fact that the pore-former is made to perform an additional function, i.e., to act as a matrix for the sintering of the electrode material.

According to the present invention there is provided a method of producing an electrode structure by coalescence comprising the steps of coalescing particles of an electrode material in the presence of particles of a pore-forming material, removing the pore-forming material from the electrode structure after the particles of the electrode material have formed a cohesive porous body, the particles of the pore-forming material being treated to form a mechanically cohesive porous body in which the electrode material is embedded during the steps of coalescence.

The characteristic feature of the method of the invention is that the pore-forming material is compacted to form a coherent body at or below the sintering temperature suitable for the electrode material concerned under actual conditions. This presupposes that the "volume" as hereinafter defined of the pore-forming material is often at least equal to the "volume" of the electrode material and that the pore-former does not undergo any "volume" changes during sintering of a type and degree such as to give rise to mechanical breakdown of the electrode material. The term "volume" as used herein denotes the dilatometric volume, which can be calculated as the product of the material weight and its density determined by dilatometric methods. The above-described effect occurs under these conditions, i.e., the pore-forming material also sinters together to form a mechanically coherent phase which is distributed in the electrode material. This phase acts as a matrix for sintering together the particles of the electrode material to form a structure having the required high porosity, large internal surface, good internal pore connections, and good mechanical and electrical properties. In some forms of the invention after the sintering together of the pore-forming material and when the electrode material has acquired sufficient strength, it may be advantageous to raise the temperature further so that the pore-forming material melts. As a result of the capillary forces in the very small gaps in the electrode material, the melt exerts a continuing stabilising effect on the electrode structure as sintering continues. An advantage of this variant of the invention is, of course, that the sintering time can be reduced as a result of the increased temperature. For most electrode materials, however, the invention can be applied without melting the pore-forming material during the sintering operation.

After sintering is complete, the compacted material may be described as a composite structure having two interwoven phases, i.e., the sintered-together electrode phase and the sintered-together pore-forming material. After the sintering operation, the pore-forming material is removed in a suitable manner, preferably by washing out. The pore-forming material frequently consists of water-soluble salts, in which case water can be used as the washing-out liquid.

The characteristic effect of the invention is clearly based inter alia on the fact that the amount of pore-forming material is large enough to ensure sufficient contact within the compacted material between the particles of the pore-forming material, so that they can coalesce at these contact surfaces, preferably by sintering. Since it is a condition that the electrode material sinters together, there is of course a limit to the appropriate proportion of pore-forming material which may be used, and this depends partly on the size and shape of the particles.

It may be advantageous to define some of the concepts at this point; the term "compacted volume" of the electrode material denotes the calculable geometric volume of the electrode material together with pore-former additives etc. directly before the sintering operation; and the "sintered volume" denotes the geometric volume of the electrode material after sintering and washing out of the pore-former. The geometric volume is calculated from the external dimensions of the electrode. The compacted volume can be divided up into the volume of the electrode material, the volume of the compacted pore-former, the free volume, and the volumes of any other additives. These various proportions of the components concerned in making up the compacted volume are dilatometric volumes.

Of special interest is the relationship between the dilatometric volume of the pore-forming material and the total dilatometric volume of all the components, including the pore-forming material, occurring in the compacted electrode material. This relationship is termed "the proportion of pore-former by volume". The proportion of pore-former by volume is at least approximately 0.5. It is often advantageous for the proportion of pore-former by volume to exceed approximately 0.6 and a very advantageous range is 0.65 to 0.80. It is, however, impossible to indicate a general top limit and the same applies to a particular bottom limit, since these limits vary somewhat with the properties of the components concerned. Generally, however, it is not practical to use a proportion of pore-former by volume in excess of approximately 0.9, since difficulties may then occur in sintering the electrode material together, despite the presence of the matrix-forming pore-former. In conventional sintering, i.e., sintering with the electrodes clamped in a holder or free sintering without mechanical pressure, the pore-former should be so selected that its melting point barely exceeds the actual sintering temperature. This is due to the fact that suitable pore-formers are relatively non-amenable to sintering as compared with the metal components in the electrode material, which, of course sinter at temperatures which may often be many hundreds of degrees C below the melting point of the material. With such conventional sintering it has been found advantageous to operate at a sintering temperature which, at least at the start of the sintering process, does not fall below the pore-former melting point by more than 125° C. It has also been found very advantageous to sinter the pore-former together at a temperature which falls below the melting point of the pore-forming material by only less than 25° C.

In order to improve the sintering of the pore-forming material, sintering activators can be added, preferably in the form of small additions of more readily melting salts. This gives a sintering-promoting effect even with contents as low as between 5 and 10 percent, and sometimes very much less, referred to the total amount of pore-forming material. Additions may also be made to accelerate the sintering of the electrode material as well. Water is a special sintering activator. It has been found that the presence of moisture often contributes to better sintering together of the pore-forming material, in the case of water-soluble pore-formers. The water frequently passes off at relatively low temperatures, depending upon the water vapour pressure curve of the pore-former concerned. There is a distinct solution and crystallisation process in the phase boundaries between the particles of the pore-forming material, and this contributes to more effective sintering together when the material temperature is reached. In the case of sodium chloride, which is a very convenient pore-former, a moisture content of less than 5 percent by weight, frequently about 1 percent by weight, referred to the salt, is sufficient to give this sintering-promoting effect. Other solvents for pore-formers may also be used for the same purpose, for example water and glycol mixtures.

An obvious requirement of the pore-forming material is that its thermal expansion should be of approximately the same magnitude as that of the electrode material. The coefficient of expansion should particularly not fall much below the co-efficient of expansion of the electrode-forming material. If this is the case, there are clearly intense stresses on the electrode-forming material during cooling after sintering. Nor should the pore-forming material experience phase-changes having appreciable changes of volume within the temperature range covered during sintering. This requirement is particularly accentuated in the case of high working pressures which result in a small free volume in the compacted material.

It was stated above that the pore-forming material should be inert with respect to the electrode-forming material. The pore-forming material should also be inert with respect to the gas occurring in the sintering furnace. In the production of metal electrodes, hydrogen is frequently used as a shielding gas and in such cases, of course, sulphates are less suitable as pore-formers, since with temperatures as low as about 500° C they are reduced to sulphides of hydrogen, with shrinkage effects as the result. To avoid such reduction of sulphates, sintering with sulphates as pore-formers must be carried out in a vacuum or in a completely inert atmosphere, such as nitrogen or helium. It may often be difficult in such cases completely to prevent oxidation as a result of traces of oxygen present in industrial shielding gases, and in that case it may be necessary for there to be a subsequent reduction in hydrogen after the pore-forming material has been washed out.

Hereinbefore the invention has been described in relatively general terms, the intention having been to describe the principle of the invention and to clarify how the invention differs from the present state of the art. It has been necessary to give this description in relatively general terms since the invention can be applied to the production of many different types of electrode and with considerable variations in the manufacturing procedures.

We shall now discuss the invention in more specific terms and we shall start with variations of the production method within the field of application of the invention. It was stated above that a natural and frequent first stage is grinding and screening of the pore-forming material which is then mixed dry with the other powders used in the electrode formulation. A weighed amount of the powder mixture is pressed to form an electrode plate, which is sintered, and then the pore-former is washed out. A variation of this production method is to produce the particles of the pore-forming material at the same time as the mixture of the electrode material. Advantageously, a concentrated solution of the pore-forming material may be supplied to the electrode material powder in a ball mill. The solvent for the pore-forming material is removed from the material in the ball mill during the grinding process. This often gives approximately the same particle sizes both for the electrode material and for the pore-forming material, and this is often an advantage. If required, the grinding process can be interrupted before all the solvent has evaporated. The paste-consistency mixture can then be used directly to form electrodes, for example by extrusion or rolling into strip form. Additions of binder, such as water-soluble cellulose derivatives, etc. can facilitate these operations. After the removal of the remaining solvent, the material is sintered, and then has a composition provided for by the invention. Another special method is to spray a suspension of electrode material and a solution of pore-former in known manner against a supporting foundation in such manner that the solvent evaporates from the fine drops on the way towards the supporting foundation. After the material components have been applied in this way, the material is advantageously compacted by pressing or rolling. It is also possible to use a liquid which has no dissolving power with respect to either the electrode material or the pore-forming material. It is also possible to use spearate solutions of electrode material and pore-former respectively, for example nickel nitrate solution and sodium chloride solution, which is sprayed against a foundation with simultaneous drying of the drops. The above examples from powder metallurgy production methods show that a compacted material having a composition provided for by the invention can be prepared in many different ways.

The choice of production method depends partly on the shape and appearance of the actual electrode. The electrodes are usually in the form of circular or rectangular discs provided with conductors and in some cases frames to prevent leakage currents or leakage of any gases, such as hydrogen and oxygen in fuel cells, or air in metal/air batteries. With this form of the electrode, it is often advantageous to use continuous production methods, such as extrusion, rolling or the like, whereupon the electrodes are cut or stamped out of the sintered strip. If the requirements for the structure and material uniformity are very stringent, the traditional process in which the powder mixture is pressed in press tools may be particularly advantageous. High porosity with considerable amounts of additives and pore-former may also require very high working pressures.

Electrodes may alternatively have different shapes from the disc or plate shape, for example be constructed in the form of tubes, rods with different profiles, or multi-tube plates. In these cases, the known extrusion processes are of course particularly advantageous.

It is also possible for pressing and sintering to be carried out in one operation, i.e., hot pressing, the pressing operation being carried out in a hot tool, or in appropriately conducted rolling operations using heated rolls. In such cases, a lower temperature can be used than in the case of sintering without high mechanical pressure. The same applies to pressure sintering, i.e., sintering under pressure. The temperature reduction possible in these cases in comparison with conventional sintering without pressure, is of the same order of magnitude as the reduction in sintering temperature for the electrode-forming material without the addition of pore-former. An extreme case, of course, is extrusion at very high pressures, which can be carried out without any special heating of the material. The choice of pore-former for this production method may also be made on the same principles as indicated for hot-pressing and pressure sintering.

Although the method according to the invention gives very good mechanical and electrical properties of the electrode material, in addition to advantageous electrochemical characteristics in consequence of the high porosity and good inner pore connections, it may sometimes be necessary, in the case of large electrode plates or when there are very stringent requirements in respect of impact resistance, etc., or porosity, to introduce special structure elements such as grids, perforate plates, etc. in order to improve the mechanical and electrical properties further. It is not difficult for those versed in the art to introduce such modifications to the construction and production where necessary. The electrode material according to the invention can also be reinforced in known manner by edge pressing or compaction in limited zones for increased mechanical strength thereof. It may be very advantageous to weld conductors to such reinforced parts. It has also been found that if the electrode thickness is reduced after sintering by pressing or rolling there is a relatively insignificant drop in performance, since the internal surface is largely retained while the mechanical properties are improved significantly. This procedure also gives a smaller electrode volume and more accurate dimensions.

We have so far discussed porous electrode materials without going into details of actual electrode types. The common feature of the porous electrode materials referred to in this specification is that the porosity of the sintered material is high, often 60 to 90 percent. After compaction operations of the kind indicated above, the porosity of the electrode material in the finished condition may be lower than these figures, which refer to the material immediately after the washing-out operation. Impregnation with active material can also reduce the final porosity.

Porous electrode materials produced according to the invention may have various functions in electrochemical cells. Firstly, a distinction must be made between variable and invariable electrode structures. Invariable structures do not change during the electrochemical processes. An example of such invariable electrodes is fuel cell electrodes or, for example, the air cathode in a metal/air cell. The porous electrode material acts in this case as a support for the catalysts of the actual fuel cell reactions, for example oxidation of methanol, hydrogen, hydrazine, ammonia, hydrocarbons, carbon monoxide or the reduction of oxygen, sulphur, chlorine, etc. The inert electrode material may itself often have a catalytic action in such reactions. There is often an interplay between the electrocatalytic activity of the electrode material and special catalysts incorporated in the electrode structure or supplied to the reaction. An example is nickel cathodes with the addition of a smaller quantity of silver catalyst.

Variable electrode structures, on the other hand, undergo change during the electrochemical reaction, i.e., are oxidised or reduced depending upon whether they are used as anode material or cathode material during the discharge. This category includes electrodes in conventional current sources, such as primary cells, for example the Leclanché cell, or the alkali manganese dioxide cell, and electrodes for conventional accumulators such as the lead-acid accumulator and various kind of alkali accumulators, of the nickel cadmium, nickel iron, silver zinc, nickel zinc and other types. Porous material according to the invention can be utilised in many different ways in these variable electrode types. The active electrode material can advantageously be prepared according to the invention. An example is porous iron anodes made by pressing and sintering iron powder with additions of a pore-former. Half of the iron is used electrochemically in sintered iron anodes produced according to the invention. This clearly also means that the other half of the electrode material acts as a support and matrix for the electrochemically reacting material. The presence of a coherent matrix can be proved by selective dissolution of discharged material from, for example, completely discharged iron anodes, a skeleton of unreacted iron remaining. A functional division of this kind can be achieved by suitable composition of the electrode material powder, which may contain a mixture of matrix-forming particles and active particles, for example a mixture of electrochemically reactive and non-reactive iron powder. Such double skeleton structures are also found in fuel cell technology. It is also possible to use a different metal for the matrix function. For example, cadmium electrodes can be produced in known manner by pressing and sintering a mixture of nickel powder and cadmium oxide powder together with the required amount of pore-former.

Another variation on this theme is to produce the supporting electrode skeleton or matrix and then impregnate this porous material in known manner with active material, such as nickel hydroxides in nickel cathodes for nickel cadmium batteries etc.

Another example is silver cathodes for various alkali accumulators. Highly porous silver cathodes can be made according to the invention directly from a mixture of silver powder or silver oxide powder and the amount of pore-former required, in this case preferably sodium chloride. The high porosity characteristic of silver electrodes prepared according to the invention gives a very good performance in this case. If a cathode of this kind is combined with a zinc electrode also prepared according to the invention, a silver zinc cell is obtained with a very high efficiency.

As indicated above, the choice of pore-former is determined by the temperature at which the electrode material can be sintered. This temperature may often be on a somewhat lower level, often 25° to 50° C lower, than in the sintering of loosely compacted electrode material powder as a result of the high working pressure which can be applied in the presence of the pore-former. The high working pressure, in fact, activates the contact surfaces in the electrode material. It is generally an advantage to carry out sintering at the lowest possible temperature, since the inner surface is reduced at higher sintering temperatures. The choice of pore-former, working pressure, sintering cycle, etc, must of course be determined experimentally with the actual electrode material formulation. From the foregoing it is apparent that the choice of pore-former is determined primarily by the level of the required sintering temperature. As will be shown below, this choice is generally an easy task.

Many different electrode materials occur in porous electrodes intended for electrochemical cells, partly due to the actual electrochemical reaction and partly whether the electrode material according to the invention is utilised as a support for the active material or itself forms the active material or performs both these functions. The materials which may be used in these porous electrodes may be metals, metal alloys, semi-metals, metalloids, oxides or other chemical compounds. Metals having a low melting point, such as lead, are used equally with metals having a high melting point, such as nickel, iron cobalt, chrome, platinum, etc. The temperatures at which the actual pore-forming materials are to coalesce to form a coherent structure therefore extend from a range around 300° C to temperatures very much in excess of 1,000° C.

The very advantageous class of compounds to be used as pore-forming material in metal electrode material is the alkali metal halides. These salts have no difficult phase conversion points to disturb the structure during sintering, are inert in hydrogen which is often used as a shielding gas during sintering of metal electrode material, such as porous iron, nickel and silver electrodes, and have a higher co-efficient of expansion than actual metals. The alkali metal halides have melting points within the range of 446° (LiI) to 990° C (NaF). Consequently, suitable pore-formers are found within this class of compound for sintering of electrode materials from zinc to the transition metals, more particularly iron and nickel, and copper and silver. Common salt (NaCl) has been found to be a very advantageous pore-forming material for sintering materials having sintering characteristics such as iron, nickel and silver at temperatures just below 800° C, usually 760° to 790° C. Common salt is cheap, relatively non-hygroscopic and can be easily crystallised, ground and screened to the required powder quality. Dendritic crystals within the range of 5 to 100$\mu$ are often preferred.

It has also been found possible to sinter lead and cadmium powder according to the invention athough in such cases the low melting points of these metals make it necessary to operate relatively far below the melting point of the pore-former which may, for example, be LiI or a mixture of halides with a still lower melting point. An example of such a mixture is 11.5 mol-percent LiF + 29.5 mol-percent LiCl + 59 mol-percent LiI, which melts at 340.9°.

In other cases it may be desirable to increase the sintering temperature to the range of 1,000° to 1,200° C, especially in the production of highly porous invariable electrode matrices of, for example, nickel for subsequent impregnation. In such cases it is possible, for example, to use $CaF_2$ or $BaF_2$ as pore-formers. Another possibility is to presinter at a temperature suitable for the pore-former, e.g., 780° C in the case of common salt, and then carry out a final sintering at the required higher temperature after the pore-former has been washed out or with the pore-former left in the electrode structure in the melted form.

The alkali metal halides, more particularly NaCl, have proved very suitable as pore-former for the method according to the invention. As indicated above, the invention is not limited to halides as pore-formers. Those versed in the art will not find it difficult to choose a suitable pore-former from the instructions in this specification, for example from the sulphates, phosphates, silicates, borates and hydroxides, with due reference to the specific reactivity of the actual electrode material and the sintering atmosphere. A very simple method of checking whether the coalescence of the pore-former to form a coherent phase which is characteristic of the invention has really been achieved is to carry out a test sintering operation in accordance with the proposed production process but with the powder of the electrode material replaced by a powder of a material which is inert under the conditions in question and which is not amenable to sintering, for example a high-melting oxide or ceramic material which is ground down to the same particle size and form as the actual electrode material. If the sintering operation under these conditions gives a cohesive body, a good result can then be expected of sintering in the same way with the actual electrode material.

The large proportion of pore-forming material is an important pre-requisite to sintering according to the invention. Of course, the sintering is also affected by the structure of the particles of the pore-former. It is often advantageous with a dendritic or irregular form of the pore-forming material. Sometimes, however, round or symmetrical particles may be advantageous, particularly in the case of gas diffusion electrodes as a result of the homogeneous pore structure obtained in such cases.

The important feature as already stated is that the quantity and distribution of the pore-former should be such as to give sufficient contact between the particles on compaction, so that they can coalesce to form a cohesive network.

It may frequently be advantageous to mix a number of different powder fractions, for example a coarser fraction combined with a finer fraction, the latter acting as a connecting link between the particles in the coarser fraction. This is particularly advantageous in gas diffusion electrodes, the size of the coarser fraction being so selected that the actual pressure differential is sufficient to displace the electrolyte from the cavities which are formed at the site of these coarser particles. Such electrodes can also be impregnated after sintering with electrolyte repelling agents, for example dispersions of polymers such as Teflon (Registered Trade Mark). It is also advantageous to vary the amount of pore-former and the particle size at different depths in the electrode, so as to achieve a graded structure. Such graded structures with, for example, larger pore diameters adjacent the gas diffusion electrode gas side, give better utilisation of the active material. Another advantage is that the structure can be so graded that the apparent internal resistance due to the pressure difference between the gas space and the electrolyte space has a suitable characteristic for voltage control.

In some cases, particles of hydrophobic material may also be mixed in the powder mixture and serve at the same time as a water-repellent agent and binder for coalescence of the particles in the active electrode material. In such cases the sintering operation proceeds at temperatures which are often relatively low due to the temperature sensitivity of the polymeric material. This in turn leads to a choice of pore-former having a low sintering temperature or the addition of sintering-activating substances, of which water is suitable for water-soluble pore-formers.

Several examples of the invention will now be described in the following Examples. Some of these Examples relate to iron anodes and air cathodes for metal air batteries. These Examples illustrate the application of the invention therefore both to storage batteries or accumulators and fuel cells. The invention of course is not limited to these Examples which simply illustrate some of the many applications indicated in the specification.

EXAMPLE 1

An iron anode for an iron air cell was produced by pressing a mixture of a carbonyl iron powder having a particle size of about 5 $\mu M$ and an apparent density of 0.8 g/cm$^3$ and common salt, which was ground to a particle size of 30 $\mu M$. One part by weight of common salt was used to two parts by weight of iron powder, equivalent to a proportion of pore-former by volume of 0.67. Pressing was carried out at a working pressure of 1.8 ton per square cm to give a circular plate of a thickness of 2.4 mm and a diameter of 100 mm. The plate was sintered at 790° C for 45 minutes in a hydrogen atmosphere. After cooling, the plate was washed in running water for 4 hours and then dried. Conductors were welded to the edge which was stamped, whereupon the electrode was ready for fitting in the cell. The porosity was 65 percent and the energy content after forming was 0.45 Ah/g referred to discharge to $Fe^{2+}$.

EXAMPLE 2

The same as Example 1, but with an iron grid (2 mm mesh, 0.3 mm wire) incorporated in the press tool.

EXAMPLE 3

The same as Example 1, but with an additional sintering in hydrogen at 850°C for 20 minutes after the washing operation.

EXAMPLE 4

The same as Example 1, but with another sintering stage at 835° C for 15 minutes, the pore-former being in the melted state.

EXAMPLE 5

An air cathode for an iron/air cell was prepared in a similar manner to Example 1. The electrode was of the known two-layer construction. The operative coarse layer, which was 0.45 mm thick, had a silver content of 5 mg Ag/cm$^2$ and a porosity of 78 percent. The fine layer which prevents air from leaking out into the electrolyte had a porosity of 45 percent and a thickness of 0.25 mm. The same carbonyl nickel powder was used in both layers. The nickel powder had an apparent density of 0.4 g/cm$^3$ and a particle size of about 5 $\mu M$. Common salt was used as pore-former and was ground down and separated into two fractions of about 20 to 30 $\mu M$ and 80 to 100 $\mu M$. The powder batch for the fine layer contained 3.5 percent by weight of common salt of a size of 20 to 30 $\mu M$. The powder batch for the coarse layer was 35 percent by weight in a size of 80 to 100 $\mu M$ and 5 percent by weight in a size of 20 to 30 $\mu M$. The 100 mm diameter press tool was charged with an even layer of the required amount of coarse layer and on the latter another layer with the required amount of fine-layer powder. After pressing at a working pressure of 1.7 ton per cm, the treatment continued as in Example 1. The cathode was welded into a plastic frame with air ducts, solution ducts and the required sealing elements.

Two cathode elements of this type were fitted in known manner together with an anode in accordance with Example 1 to form a complete iron/air cell with end plates, two air frames, two cathodes and two electrolyte chambers with 5 M KOH surrounding the central iron anode. On operation in air at a pressure difference of 0.2 bar and an operating temperature of 60° C, the cell can be loaded with 60 mW/cm$^2$ cathode area at a current density of 110 mA/cm$^2$. If the cathodes are fed with oxygen gas instead of air, these figures are doubled.

The above details well illustrate the advantages in the production of electrode structures according to the invention as compared with the present state of the art. Technical advantage must ultimately be measured in economic terms. The high porosity of the cathode in conjunction with its thinness results in an insignificant consumption of expensive nickel material. The open and relatively coarse-pored structure results in insignificant catalyst requirements, since the catalyst is exposed very effectively to the reactants in the interior of the electrode. The coarse-pored structure also allows effective operation at a lower differential pressure between the air side and the electrolyte side than was possible previously with this electrolytephilic electrode type. This reduces the pumping work requirements and simplifies the battery construction. On the anode side the efficiency is very much in excess of that achieved with other production methods. All these factors have an economising effect on costs so that the actual iron air battery can, as a result of the invention, give lower material costs than the lead-acid battery for the same kWh capacity. In addition to this important advantage, there is the increase in the specific power to weight ratio of the iron air battery in kWh/kg, which is obviously a result of the reduced electrode weight.

Some Examples will now be described to illustrate the application of the invention to alkali nickel electrodes.

EXAMPLE 6

A nickel matrix with extra high porosity for subsequent impregnation in known manner with Cd + Cd(OH)$_2$ or Ni(OH)$_2$ was prepared by sintering a carbonyl nickel powder with BaF$_2$ as pore-former. The proportion of pore-former by volume in the powder mixture was 0.92 in this case. Pressing at a working pressure of 1.5 ton per square metre was carried out against a nickel-coated perforate iron plate over a material thickness of 0.1 mm of the type used as a supporting element in conventional nickel sinter. Sintering at 1,180° C for 35 minutes gave a sinter having a porosity of about 90 percent. The structure was stabilised by the pore-former, thus giving much less shrinkage than in conventional sintering. After washing out in an aqueous ammoniacal solution, the sinter was impregnated in known manner.

EXAMPLE 7

The same as Example 6, but with a grid instead of the perforate plate.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim is:

1. A method of forming a porous electrode body comprising:

mixing particles of an electrode material with particles of a water-soluble pore-forming material, the pore-forming material being present in an amount large enough to ensure sufficient contact within the compacted body between the pore-forming particles such that these particles may coalesce during sintering, said amount being between from about 50 to 90 percent of the total volume of the electrode;

compacting the mixture to from a green electrode;

sintering the mixture at a temperature between the melting point of the pore-forming material and 125° C. below the melting point of the pore-forming material to form a composite electrode structure having two interwoven sintered phases, one of the electrode material and the other of the pore-forming material;

and thereafter leaching the sintered electrode to remove the pore-forming agent from the pores of the electrode.

2. The method of claim 1 wherein said pore-former has a melting point of less than about 25° C above the sintering point of the electrode material.

3. A method as claimed in claim 1, wherein the pore-former is sodium chloride.

4. A method as claimed in claim 1, wherein the electrode material is mainly iron.

5. A method as claimed in claim 1, wherein the electrode material is mainly nickel.

6. A method as claimed in claim 1, wherein the electrode material is silver.

* * * * *